United States Patent
Delaney et al.

(10) Patent No.: US 10,897,788 B2
(45) Date of Patent: Jan. 19, 2021

(54) WIRELESS CONNECTION ESTABLISHMENT BETWEEN DEVICES

(71) Applicant: Lenovo (Singapore) Pte. Ltd., Singapore (SG)

(72) Inventors: Mark Patrick Delaney, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 205 days.

(21) Appl. No.: 16/204,131

(22) Filed: Nov. 29, 2018

(65) Prior Publication Data
US 2020/0178328 A1 Jun. 4, 2020

(51) Int. Cl.
*H04L 12/801* (2013.01)
*H04L 12/24* (2006.01)
*H04B 1/00* (2006.01)
*H04W 84/18* (2009.01)
*H04W 76/14* (2018.01)
*H04L 29/08* (2006.01)
*H04W 4/80* (2018.01)

(52) U.S. Cl.
CPC ............ *H04W 76/14* (2018.02); *H04L 67/22* (2013.01); *H04L 67/303* (2013.01); *H04W 4/80* (2018.02)

(58) Field of Classification Search
CPC ........ H04W 76/14; H04W 4/80; H04L 67/22; H04L 67/2819
See application file for complete search history.

(56) References Cited

U.S. PATENT DOCUMENTS

| | | | |
|---|---|---|---|
| 9,497,580 B1 | 11/2016 | Cudak et al. | |
| 2006/0104224 A1* | 5/2006 | Singh | G07C 9/37 370/310 |
| 2008/0239976 A1* | 10/2008 | Altman | H04B 7/18593 370/252 |
| 2009/0265470 A1 | 10/2009 | Shen et al. | |
| 2011/0099617 A1* | 4/2011 | Ponnath | H04L 63/0823 726/7 |
| 2013/0197693 A1* | 8/2013 | Kamen | G16H 30/20 700/244 |
| 2015/0188945 A1* | 7/2015 | Kjeldaas | G06F 21/6245 726/1 |
| 2017/0069288 A1* | 3/2017 | Kanishima | G06F 3/147 |
| 2017/0099430 A1* | 4/2017 | Fukui | H04N 5/23293 |
| 2017/0230415 A1* | 8/2017 | Xu | H04L 61/6022 |
| 2017/0262715 A1* | 9/2017 | Kozuka | G08G 1/166 |

(Continued)

*Primary Examiner* — Faruk Hamza
*Assistant Examiner* — Abusayeed M Haque
(74) *Attorney, Agent, or Firm* — Ference & Associates LLC (57) ABSTRACT

One embodiment provides a method, including: receiving, at an information handling device, context data associated with a user's interactions with another device; determining, using a processor, whether the context data is associated with device use data, wherein the device use data corresponds to an intention of the user to operate the another device; and establishing, responsive to determining that the context data is associated with the device use data, a wireless connection between the information handling device and the another device. Other aspects are described and claimed.

18 Claims, 3 Drawing Sheets

(56) References Cited

U.S. PATENT DOCUMENTS

2018/0158288 A1* 6/2018 Logan ................... G01S 19/51
2018/0324511 A1* 11/2018 Asada ..................... H04R 3/00
2020/0167491 A1* 5/2020 Grabois ............... G06F 21/554

* cited by examiner

WIRELESS CONNECTION ESTABLISHMENT BETWEEN DEVICES

BACKGROUND

Information handling devices ("devices"), for example smart phones, tablet devices, laptop and personal computers, and the like, may be capable of establishing wireless connections with one or more other electronic devices. For example, a smart phone may be paired with a wireless headset, a tablet device may be paired with a smart TV, etc. After the connection is established, the control device (i.e., the smart phone, tablet, laptop, etc.) may be able to control one or more functions of the wirelessly connected electronic device. For instance, in the foregoing examples, the smart phone may be able to control the media played on the wireless headset and the tablet device may be able to select and control the content played on the smart TV.

BRIEF SUMMARY

In summary, one aspect provides a method, comprising: receiving, at an information handling device, context data associated with a user's interactions with another device; determining, using a processor, whether the context data is associated with device use data, wherein the device use data corresponds to an intention of the user to operate the another device; and establishing, responsive to determining that the context data is associated with the device use data, a wireless connection between the information handling device and the another device.

Another aspect provides an information handling device, comprising: a processor; a memory device that stores instructions executable by the processor to: receive context data associated with a user's interactions with another device; determine whether the context data is associated with device use data, wherein the device use data corresponds to an intention of the user to operate the another device; and establish, responsive to determining that the context data is associated with the device use data, a wireless connection between the information handling device and the another device.

A further aspect provides a product, comprising: a storage device that stores code, the code being executable by a processor and comprising: code that receives context data associated with a user's interactions with another device; code that determines whether the context data is associated with device use data, wherein the device use data corresponds to an intention of the user to operate the another device; and code that establishes, responsive to determining that the context data is associated with the device use data, a wireless connection between an information handling device and the another device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A popular and frequently used wireless technology standard for exchanging data over short distances is BLUETOOTH. BLUETOOTH is a registered trademark of BLUETOOTH SIG, INC. in the United States and other countries. Generally, when initiating a BLUETOOTH connection between devices, the two devices need to first be paired (i.e., the process required to mutually register the information on BLUETOOTH-enabled devices to be connected wirelessly). Pairing information is retained even if the devices are turned off so it is not necessary to pair the same devices again. Therefore, on subsequent instances of desired device connection, the paired devices may be wirelessly connected in a quicker fashion. As used forth herein, "pairing" may refer to the first time connection between devices whereas "connecting" may refer to the $2^{nd}$ time+n connection between devices (i.e., devices that have previously been paired).

Conventional solutions for pairing and/or connecting devices are generally manual in nature. For example, some wireless connection protocols require the holding of one or more buttons on one or more devices for a predetermined period of time prior to establishing a wireless connection. Such a requirement may be burdensome and time-consuming to a user. As another example, some wireless connection protocols may require a user to navigate a sequence of menus on one or more screens to identify a device they would like to establish a connection with. In this situation, within the menus of available BLUETOOTH-enabled devices, the available device list is generally presented in historical or alphabetical form. More particularly, these lists do not comprise any relation to what the user is currently doing to more optimally pair/connect to surrounding devices. Accordingly, a solution is needed to more efficiently identify the device a user wishes to engage with and thereafter establish a wireless connection with that device.

Accordingly, an embodiment provides a method for dynamically establishing a wireless connection with a device a user is intending to use. In an embodiment, context data associated with a user's interactions with another device may be received at a control device. The context data may be received from a variety of different sources, for example, from one or more sensors integral to the control device or to the other devices. In an embodiment, the context data may identify, for instance, a device a user is looking at, a device a user is holding, a command input provided by the user that involves an action to be performed by a device, and the like. An embodiment may thereafter determine whether the context data is associated with stored device use data (i.e., data that corresponds to an intention of a user to operate a device). Responsive to determining that the context data is associated with device use data, an embodiment may thereafter establish a wireless connection between the two devices. Such a method may allow for the quick establishment of a wireless connection between a control device and another device a user is intending to use.

The illustrated example embodiments will be best understood by reference to the figures. The following description is intended only by way of example, and simply illustrates certain example embodiments.

Figure 1:
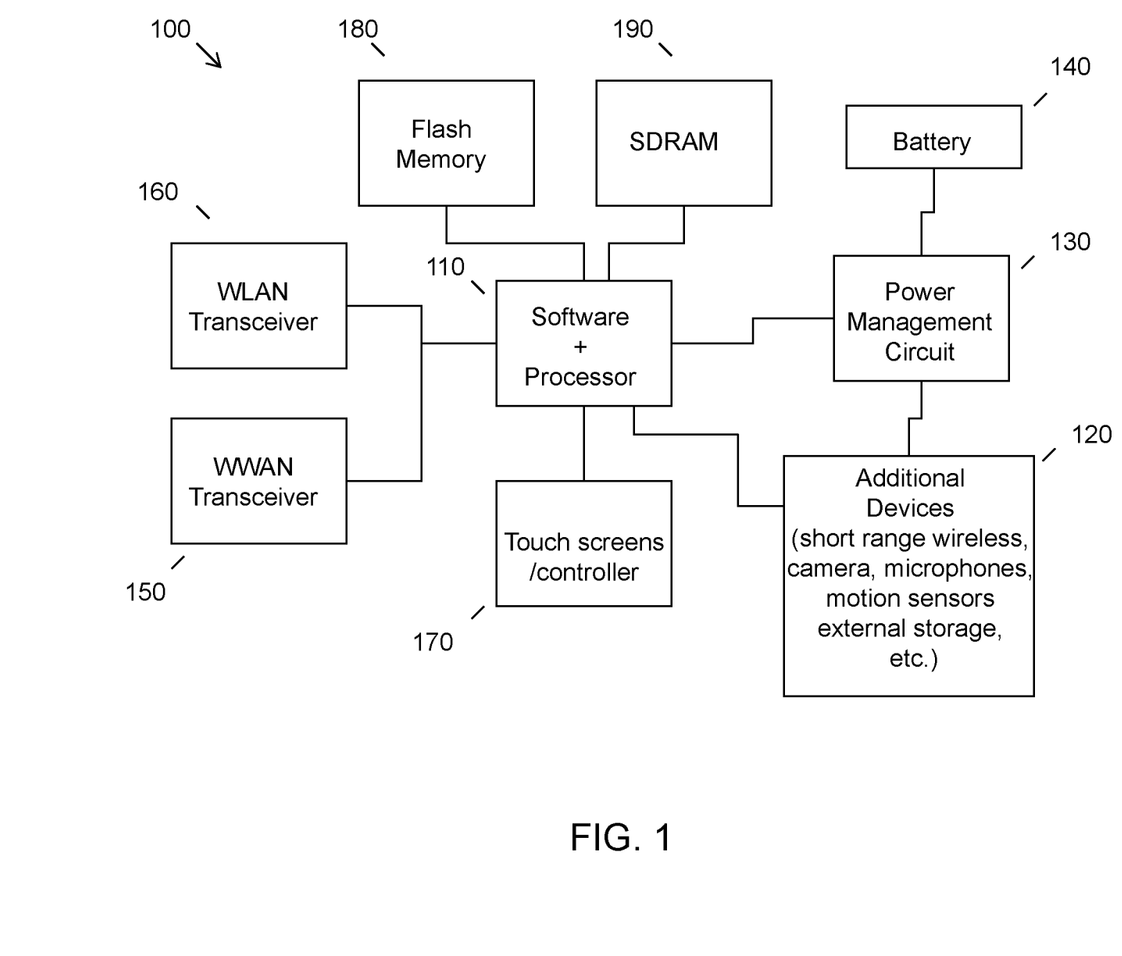
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
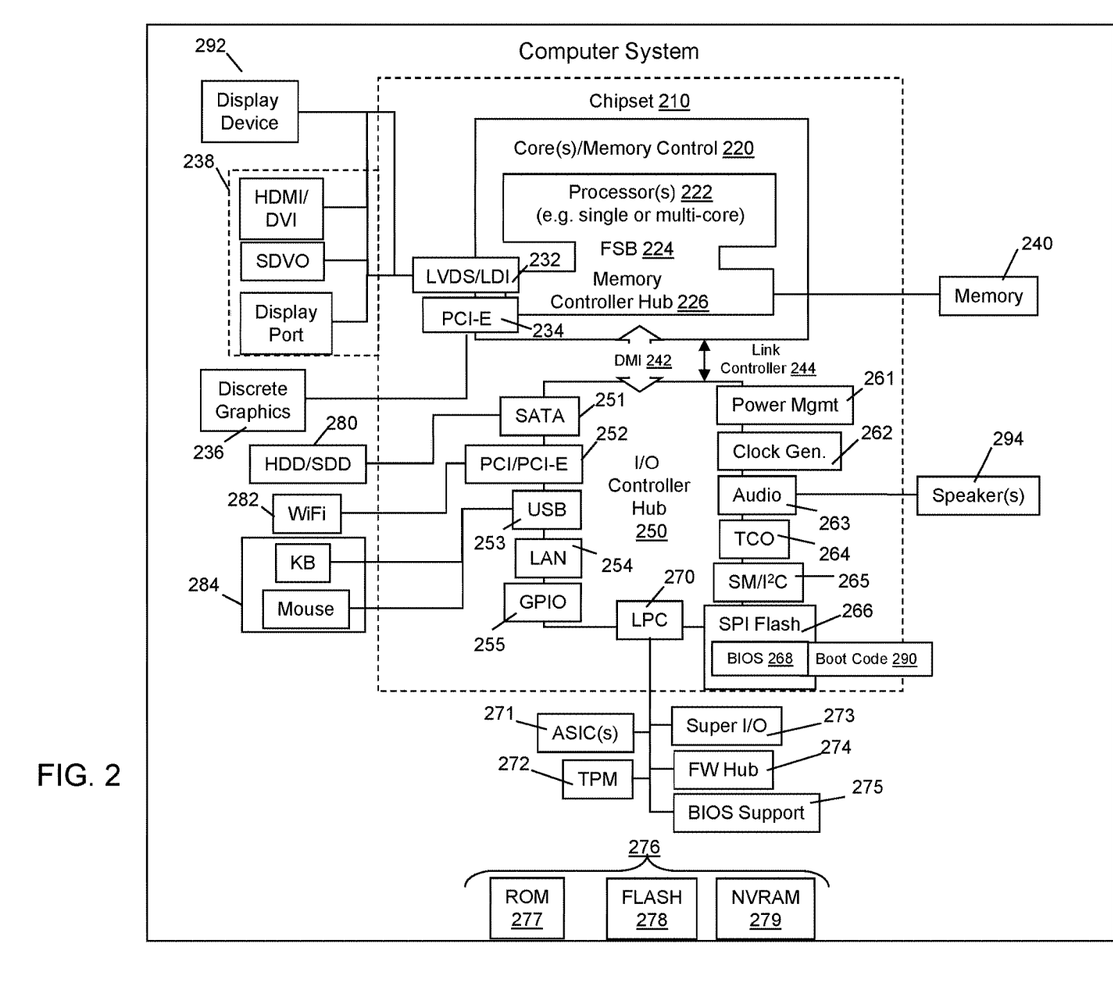
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart appliances, other smart devices, personal computer devices generally, and/or electronic devices that are capable of capturing context data and establishing wireless connections with each other. For example, the circuitry outlined in FIG. 1 may be implemented in a tablet or smart phone embodiment, whereas the circuitry outlined in FIG. 2 may be implemented in a laptop embodiment.

Figure 3:
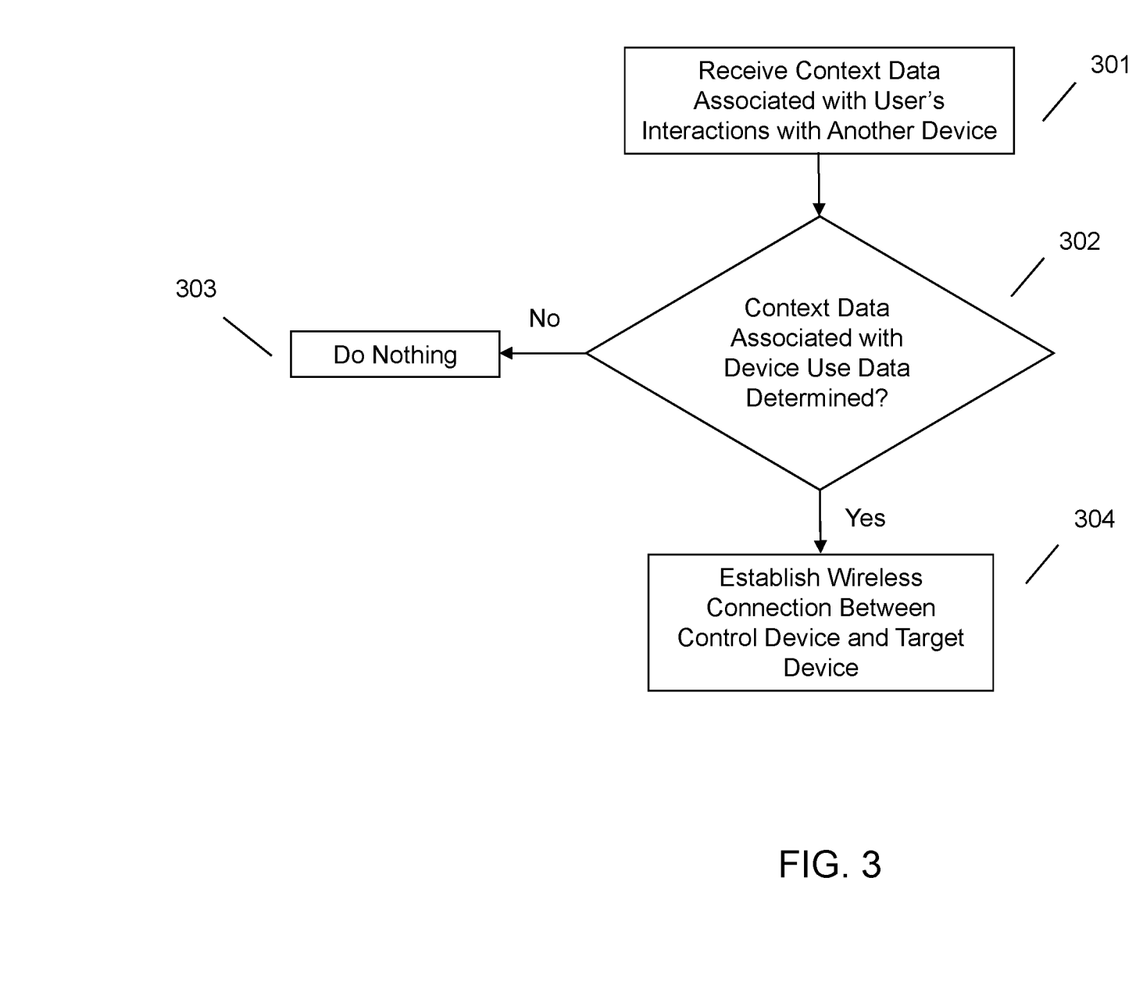
FIG. 3 illustrates an example method of establishing a wireless connection between electronic devices.

Referring now to FIG. 3, an embodiment may establish a wireless connection between a control device and another device contextually identified to be of interest to a user. At 301, an embodiment may receive context data associated with a user. In an embodiment, the context data may be virtually any type of data that may provide an indication of a user's interactions with another device. For example, the context data may relate to a device a user is holding, a device a user is proximate to, a user's position in a space, an object or device a user may be looking at, a conversation a user may be engaged in with another individual, a command a user has provided to a digital assistant, and the like.

In an embodiment, the context data may be captured by one or more sensors (e.g., cameras, light sensors, motion sensors, microphones, accelerometers, etc.) integral to a control device, a target device, another device, or any combination of the foregoing. As used herein, a control device may be any device that is capable of instructing a target device to perform one or more functions. For example, in the case of a smart phone and a wireless headset, the smart phone may be the control device that may control what is being played on the wireless headset (i.e., the target device). If the context data is captured by sensors integral to the target device or another device, this data may be transmitted to the control device via a wired or wireless connection for processing. In an embodiment, one or more of the sensors may be always on (i.e., always monitoring for context data). Alternatively, in another embodiment, one or more of the sensors may only activate responsive to identifying that a predetermined condition has occurred (e.g., when a user's presence in a space is detected, when audible user input is detected, when the control device has been picked up or moved, etc.).

At 302, an embodiment may determine whether the context data is associated with device use data. In the context of this application, device use data may correspond to stored data (e.g., stored in an accessible local or remote storage location, etc.) documenting instances in which a user's intention to use and/or operate a target device has been confirmed. In an embodiment, the determination may be conducted by comparing the context data to the device use data. An embodiment may determine that the context data corresponds to the device use data responsive to identifying that context data shares a predetermined threshold level of similarity to the device use data. In an embodiment, device use data may be programmed in by a programmer or manufacturer, provided by a user, or both. A plurality of non-limiting example embodiments related to this determination step are provided below. The following example determination methods may be used alone or in combination to determine whether the received context data corresponds to device use data.

In an embodiment, an image of a user may be captured and analyzed to determine whether a user intends to interact with a target device. In the context of this application, an "image" may refer to a static image (e.g., a picture, etc.), a dynamic image (e.g., a recorded video, a live video, etc.), a combination thereof, and the like. In such an embodiment, the image may first be analyzed (e.g., using one or more conventional image analysis techniques, etc.) to identify the "type" of interactions a user may be having with a device. An interaction "type" may refer to the proximity of a user to a device, how the user is holding a device, what the user is doing on or to a device, where a device is located on the user's person, whether the user is having any interactions at all with a device, any combination of the foregoing, and the like. The type of the user's interactions may thereafter be compared to device use data to determine whether the user's interactions correspond to known interactions of a user intending to use a particular device. For example, an embodiment may identify the presence of a user and a pair of wireless headphones in a captured image. Device use data indicating that a user intends to interact with a pair of headphones may include images of a user holding a pair of wireless headphones in their hands, having the headphones situated on the user's head, having the headphones positioned in the user's ear, and the like. Responsive to identifying any of the foregoing interactions between the user and the pair of wireless headphones in the captured image, an embodiment may conclude that a user intends to use the headphones and/or that the pair of wireless headphones are likely the target device to control.

In an embodiment, eye-tracking methodologies may be utilized to identify an object a user is looking at. In such an embodiment, one or more images of a user may be captured and analyzed to determine a direction of the user's gaze and whether the direction of the user's gaze corresponds to a particular target device. An embodiment may attempt to make this determination substantially constantly (i.e., each time a user appears in an image). Alternatively, an embodiment may attempt to make this determination responsive to identifying that a user has stared at a particular device, or in a particular direction, for a predetermined amount of time (e.g., 5 seconds, 10 seconds, 30 seconds, etc.). An embodiment may compare this determination result to device use data to identify whether a user desires to establish a wireless connection. For example, stored device use data may indicate that a user who has stared at a smart TV for 5 or more seconds desires to connect their smart phone to the smart TV. Accordingly, responsive to identifying that a user has stared at a smart TV for 8 seconds, an embodiment may predict that the user desires to establish a wireless connection with the smart TV.

In situations where an embodiment can identify a direction of the user's gaze but cannot identify an object a user is looking at (e.g., because the gazed-at object is outside a field of view of a capturing camera, etc.), an embodiment may be able to access stored spatial data of a space a user may be located in to predict an object the user is looking at. The stored spatial data may comprise indications regarding the locations of particular objects located in a space. For example, an embodiment may be able to identify a space a user is located in (e.g., using wireless positioning data, GPS data, object identification data, etc.). Additionally, an embodiment may be able to identify a direction a user is staring at in that space. Accordingly, an embodiment may access stored spatial data comprising the locations of objects in that space to identify a target object that corresponds with the user's gaze direction.

In an embodiment, an audible input device (e.g., a microphone, etc.) may capture audible user input that may be analyzed to identify a target device a user is intending to use. In an embodiment, audio may be captured from a user's conversation with one or more other individuals. For example, a user may be talking to another individual and say "John, put the music on the speaker". An embodiment may analyze this conversation and be able to identify a speaker device within proximity to, or connectable to, the control device (e.g., by accessing device use data that comprises a listing of all connectable devices within a predetermined space and how these devices are commonly referenced in common parlance, etc.). In another embodiment, an embodiment may be able to identify a particular device form a plurality of the same type of device. For example, a user may be talking to another individual and say "John, put the game on the big TV". An embodiment may analyze this conversation and be able to differentiate between two or more TVs by accessing, for example, tag descriptions associated with each device (e.g., where the tags may be dimensional descriptions, brand names, colors, etc.).

In an embodiment, a control device may receive motion data obtained by one or more motion sensors (e.g., an accelerometer, gyroscope, etc.) integrated into a target device. An embodiment may then compare the received motion data to device use data comprising stored motion data associated with instances in which a user's intention to operate a target device has been identified. For example, a control device (e.g., a smart phone, etc.) may receive motion data from a speaker that has just been moved. An embodiment may then determine whether the motion characteristics of the speaker movement data correspond to device use data of a speaker being moved prior to operation (e.g., by determining if the speed, direction, and/or acceleration of the speaker substantially correspond to speed, direction, and/or acceleration of known instances of speaker operation stored in the device use data, etc.).

Responsive to determining, at 302, that the context data does not correspond to device use data, an embodiment may, at 303, do nothing. More specifically, an embodiment may take no additional steps to establish a connection between a control device and a target device. Conversely, responsive to determining that the context data does correspond to device use data, an embodiment may establish, at 304, a wireless connection between the control device and the target device. In an embodiment, a notification that a successful wireless connection has been established between the control device and the target device may be provided to the user. The notification may be one or more of a visual notification (e.g., a message on a display screen of the control device, etc.), an audible notification (e.g., an audible confirmation provided by one or more speakers associated with the control device or the target device, etc.), a haptic notification, a combination thereof, and the like. In an embodiment, the establishment of the wireless connection may be applicable to either the pairing or the connecting stage.

In an embodiment, a predetermined function may be executed by the control device, the target device, or both subsequent to the establishment of the wireless connection. The determination of which predetermined function to execute may be based on one or more factors. For instance, an embodiment may be programmed to always execute a single, specific function when a connection is established. For example, in an embodiment, responsive to establishing a wireless connection with a wireless headset, a control device may open a predetermined application (e.g., a wireless headset control application, etc.). In a different instance, various types of context data (e.g., time of day, location, ambient sound levels, etc.) may influence which predetermined function is executed. For example, responsive to a control device establishing a wireless connection with a smart TV at 7 AM on a weekday, the smart TV may automatically change the channel to a particular morning news show. As another example, the ambient sound levels of a space may be identified. Responsive to a control device establishing a wireless connection with a wireless headset, the volume that media is played on the wireless headset may be dynamically adjusted to account for the ambient sound in the space (e.g., increase the volume if the ambient sound is loud, etc.).

In an embodiment, an established wireless connection between a control device and a target device may be terminated subsequent to the identification of another target device a user intends to use. For example, if a wireless connection is established between a smart phone and a smart TV, that wireless connection may be terminated responsive to receiving context data that a user has put on a pair of wireless headphones.

The various embodiments described herein thus represent a technical improvement to conventional wireless connection establishment techniques. Using the techniques described herein, an embodiment may receive context data associated with a user's interactions with a device. An embodiment may then determine whether the context data is associated with device use data. Responsive to arriving at a positive determination, an embodiment may then establish a wireless connection between a control device and a target device. Such a method may allow a wireless connection to dynamically be established with a target device a user intends to use/operate.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, context data associated with a user's interactions with another device;
   determining, using a processor, whether the context data is associated with device use data, wherein the device use data corresponds to an intention of the user to operate the another device;
   establishing, responsive to determining that the context data is associated with the device use data, a wireless connection between the information handling device and the another device; and
   instructing the another device to perform a predetermined function responsive to establishing the wireless connection.

2. The method of claim 1, wherein the receiving comprises receiving the context data from at least one sensor integral to the another device.

3. The method of claim 2, wherein the at least one sensor is a sensor selected from the group consisting of a light sensor, a camera, an accelerometer, and a microphone.

4. The method of claim 1, wherein the determining comprises accessing an accessible storage database comprising the device use data and comparing the received context data to the device use data in the accessible storage database.

5. The method of claim 4, further comprising determining that the context data is associated with the device use data by identifying that the context data shares a predetermined level of similarity to the device use data.

6. The method of claim 1, wherein the establishing the wireless connection comprises at least one of connecting and pairing the information handling device to the another device.

7. The method of claim 1, wherein the predetermined function is based on one or more contextual factors.

8. The method of claim 1, further comprising providing a notification to the user that the wireless connection is established.

9. The method of claim 1, further comprising terminating the wireless connection with the another device and establishing another wireless connection with a different device responsive to receiving different context data associated with the user's interactions with the different device, wherein the different context data is associated with the device use data.

10. An information handling device, comprising:
    a processor;
    a memory device that stores instructions executable by the processor to:
    receive context data associated with a user's interactions with another device;
    determine whether the context data is associated with device use data, wherein the device use data corresponds to an intention of the user to operate the another device;
    establish, responsive to determining that the context data is associated with the device use data, a wireless connection between the information handling device and the another device; and
    instruct the another device to perform a predetermined function responsive to establishing the wireless connection.

11. The information handling device of claim 10, wherein the instructions executable by the processor to receive comprise instructions executable by the processor to receive the context data from at least one sensor integral to the another device.

12. The information handling device of claim 10, wherein the instructions executable by the processor to determine comprise instructions executable by the processor to access an accessible storage database comprise the device use data and compare the received context data to the device use data in the accessible storage database.

13. The information handling device of claim 12, wherein the instructions are further executable by the processor to determine that the context data is associated with the device use data by identifying that the context data shares a predetermined level of similarity to the device use data.

14. The information handling device of claim 10, wherein the instructions executable by the processor to establish the wireless connection comprise instructions executable by the processor to connect the information handling device to the another device or pair the information handling device to the another device.

15. The information handling device of claim 10, wherein the predetermined function is based on one or more contextual factors.

16. The information handling device of claim 10, wherein the instructions are further executable by the processor to provide a notification to the user that the wireless connection is established.

17. The information handling device of claim 10, wherein the instructions are further executable by the processor to terminate the wireless connection with the another device and establish another wireless connection with a different device responsive to receiving different context data associated with the user's interactions with the different device, wherein the different context data is associated with the device use data.

18. A product, comprising:
a storage device that stores code, the code being executable by a processor and comprising:
code that receives context data associated with a user's interactions with another device;
code that determines whether the context data is associated with device use data, wherein the device use data corresponds to an intention of the user to operate the another device;
code that establishes, responsive to determining that the context data is associated with the device use data, a wireless connection between an information handling device and the another device; and
code that instructs the another device to perform a predetermined function responsive to establishing the wireless connection.

* * * * *